June 23, 1953 F. V. BROADY 2,642,693
APPARATUS FOR RETRIEVING FISHING TACKLE OR THE LIKE
Filed July 22, 1947
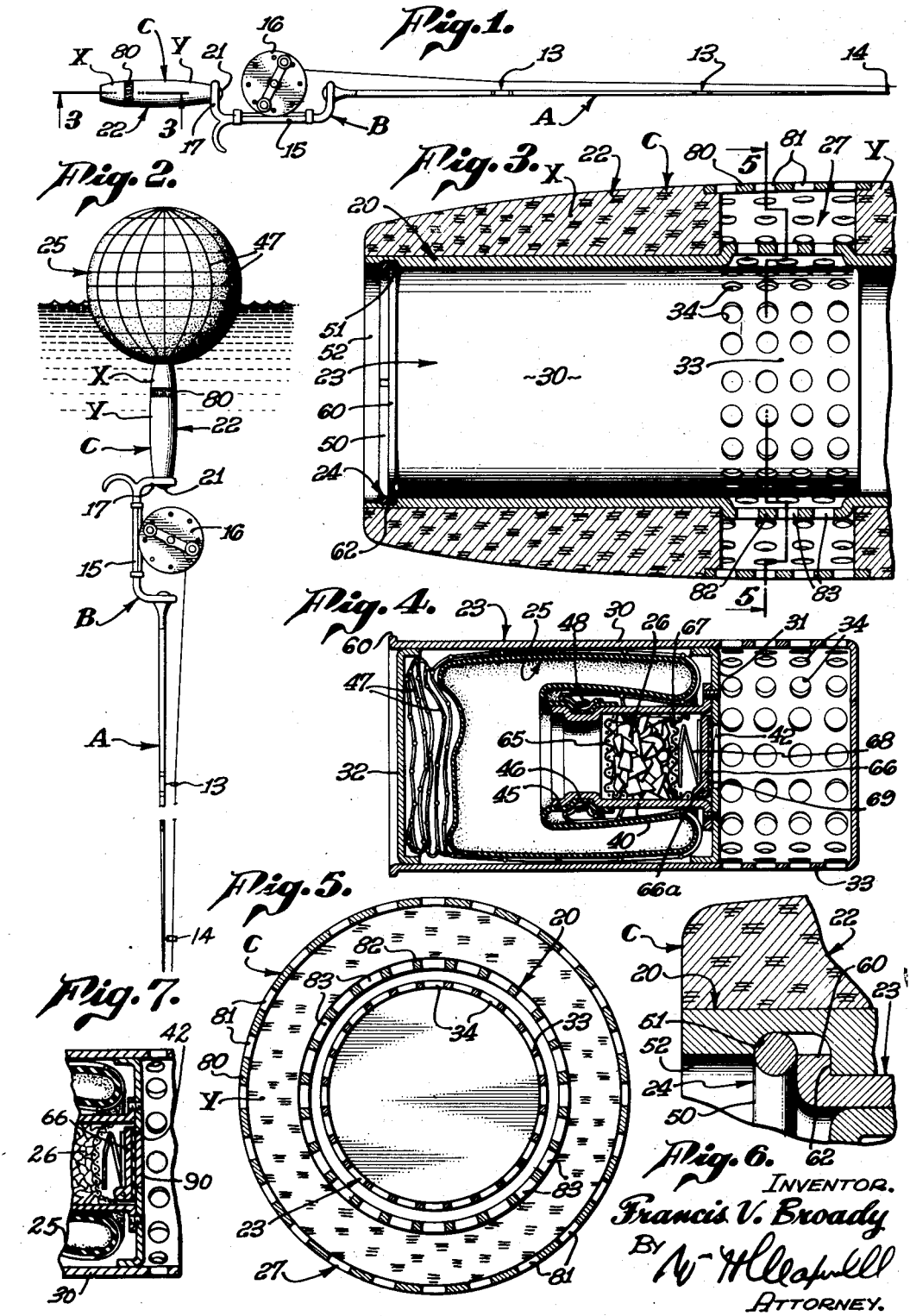
INVENTOR.
Francis V. Broady
BY
ATTORNEY.

Patented June 23, 1953

2,642,693

UNITED STATES PATENT OFFICE 2,642,693

APPARATUS FOR RETRIEVING FISHING TACKLE OR THE LIKE

Francis V. Broady, South Gate, Calif.

Application July 22, 1947, Serial No. 762,608

8 Claims. (Cl. 43—23)

1

This invention relates to apparatus for retrieving fishing tackle, or the like, and a general object of the invention is to provide a simple, practical, durable construction, particularly useful in or as applied to fishing poles, or the like.

Fishing tackle such as poles and reels is often finely constructed and is consequently valuable. Such equipment and other like apparatus used around bodies of water is subject to being accidentally dropped into the deep water and consequently lost.

It is a general object of the present invention to provide a practical improved float or float inflating device applicable to a fishing pole, or the like, and serving to float such equipment upon its being dropped into the body of water.

Another object of the invention is to provide a simple, dependable device that becomes energized upon being submerged in water but which is such that it may be submerged in shallow water and may get water on it from wet hands or through normal use without effect.

Another object of the invention is to provide apparatus of the general character referred to in which the active elements requiring removal or replacement after use or from time to time are in a cartridge-like unit which is simple and convenient to handle.

Another object of the invention is to provide a construction of the character mentioned which is such that it may be advantageously incorporated in the form of a handle for a device such as a fishing pole, or the like.

The various objects and features of my invention will be fully understood from the following detailed description of a typical preferred form and application of the invention, throughout which description reference is made to the accompanying drawings, in which:

Fig. 1 shows a typical fishing pole the handle of which incorporates the structure of the present invention. Fig. 2 is a view showing the pole with the device of the present invention inflated serving as a float maintaining the pole suspended in a body of water. Fig. 3 is an enlarged detailed sectional view taken substantially as indicated by line 3—3 on Fig. 1 showing the structure of the present invention, with the cartridge being shown in longitudinal elevation, rather than in section. Fig. 4 is an enlarged longitudinal detailed sectional view of the cartridge which, when in normal position, is within the structure as shown in Fig. 3. Fig. 5 is a detailed transverse sectional view taken as indicated by line 5—5 on Fig. 3. Fig. 6 is an enlarged detailed sectional

2 view illustrating the manner in which the cartridge is releasably retained in position within the tubular body 20. Fig. 7 is a view similar to a portion of Fig. 4 showing a soluble seal at the inner end of the cartridge.

The structure of the present invention is shown applied to fishing tackle as this is a typical application in which the invention can be advantageously used. In the particular case illustrated in the drawings I show a fishing pole A with a reel seat B at its inner end and with a handle C connected with or projecting from the reel seat. In the particular case illustrated the pole is shown equipped with line guides 13 and a tip 14 and the reel seat B is shown with an offset reel-carrying base 15 supporting a suitable reel 16. A bracket 17 projects from the base 15 and carries the handle C.

The handle C which embodies the structure provided by my invention includes an elongate tubular body or member 20 fixed at its inner end to the bracket 17 of the reel seat as by a suitable retainer or fastener 21. The outer or rear end of the body 20 is open and unrestricted as shown in Fig. 3 of the drawings.

Other elements of the construction include a grip 22 applied to the body 20, a cartridge 23 inserted in the body 20, releasable retaining means 24 normally releasably retaining the cartridge in the body, an inflatable bag or balloon 25 attached to and normally confined within the cartridge, a gas generating charge 26 carried in the cartridge and means 27 admitting or conducting water to the cartridge to actuate the charge 26.

The grip 22 is provided on the exterior of the body 20 and preferably extends from one end of the body to the other, forming a comfortable, conveniently shaped handle or grip by which the tackle can be manipulated. In practice the grip may be formed of cork, sponge rubber, or other suitable material.

The cartridge 23 which is a unitary element, as shown in Fig. 4, is adapted to be inserted into the body 20 from the open outer end of the body. The cartridge in its preferred form involves a tubular case 30, an inner wall 31 located in the case, a removable closure 32 at the outer end of the case and other features, as will be hereinafter disclosed. In the preferred form of the invention shown in the drawings the inner end portion 33 of the case 30 extending inwardly beyond the wall 31 is provided with a plurality of openings or perforations 34 such as to admit water from the exterior of the cartridge to the wall 31. The closure 32 may be a simple, disclike part, frictionally engaged in the outer end of the case 30 to be removable from the case by pressure applied from within the case.

In the preferred construction shown in the drawings a tubular shell 40 is carried by and projects forwardly from the wall 31 and serves as a holder for the charge 26, and as a part to which the balloon 25 is attached. The shell 40 is shown fixed to the wall 31 to be in communication with an opening 42 provided in the wall 31.

The bag or balloon 25 may be a rubber or suitable balloon structure, preferably provided with a neck 45 which fits over and is secured to the projecting end portion of shell 40, the shell having a reduced outer end portion forming a channel 46 receiving the neck 45. In the preferred construction a reinforcing net 47 is provided to surround the balloon 25 to restrain it as shown in Fig. 2 of the drawings, which net is normally confined within the cartridge and is attached to the shell 40 preferably over the neck 45. In the drawings I have shown a suitable tie member 48 securing the net and the neck portion of the balloon to the shell.

The case 30 of the cartridge is preferably proportioned to slidably fit into the body 20 and the releasable retaining means 24 is preferably provided at the outer open end of the body. In the case illustrated the means 24 involves a split snap ring 50 carried in a recess 51 provided in a counterbore 52 in the outer end of the body 20. The outer end of the case 30 is provided with an outwardly projecting radial flange 60 that seats on the bottom 62 of the counterbore and the ring 50 is such as to normally overlie or overhang the flange 60 and retain the flange against the seat, as shown in Fig. 6.

The gas generating charge 26 is carried in the shell 40 and may be retained or confined in the shell in any suitable manner. In the case illustrated I have shown the charge confined between a screen 65 seated against the reduced portion of the shell and a disc or valve 66 at the inner end of the shell which valve normally closes the opening 42. In the particular case illustrated a second or inner screen 67 is provided at the inner end of the charge and a compression spring 68 acts between the screen 67 and the valve 66 holding the valve tight against the wall 31 and the charge tightly compact between the screens. As shown in the drawings the valve may have a sealing face 69 of rubber, or the like, to engage the wall 31 around the opening 42.

The parts just described form a valve which opens to admit water to charge 26 at a predetermined pressure. Spring 68 may be of such strength as to normally yieldingly press the valve 66 into sealing engagement with the wall 31. A predetermined head of pressure exerted on the valve 66 through opening 42 will depress or operate the disc and compress the spring thereby admitting water to the charge 26. In practice I relate the parts so that the disc and spring are depressed at a depth of about one to two feet beneath the surface of the water. If desired a water soluble seal may be provided at the inner end of the cartridge. For example, the opening 42 may be initially closed or sealed by a body of soluble sealing material 90, as shown in Fig. 7 of the drawings. Seal 90 and closure 32 seal the cartridge so that moisture is positively excluded from the charge in the cartridge.

The charge 26 is a gas generating charge such as to inflate the balloon 25. The charge is preferably one which is activated or which reacts with water to generate gas. In practice any suitable material that will generate gas when contacted with water may be used. For example, I may employe calcium carbide or other suitable gas producing materials. The disc 66 serves to normally prevent water reaching the charge and it also serves to prevent gas escaping from the balloon 25. The valve thus formed is quick acting and responds quickly to pressure either inside or outside the balloon. In practice I may employ a disc hinged at one edge portion on a pivot pin 66$^a$ carried by the shell 40.

The means or construction 27 by which water is conducted to the cartridge may vary widely. However, in accordance with my preferred construction, when the cartridge fits snugly in the body as shown in the drawings, this means involves a channel construction in the body or is such that water passes through the body to reach the inner end of the cartridge. In the particular case illustrated the grip or sleeve 22 is shown so that if it were solid or uninterrupted it would cover that portion of the body through which water is admitted as by perforations 34. The grip in this case is formed in two longitudinally separated sections X and Y, the space between the sections forming a laterally extending channel to admit water from the exterior of the grip to the body 20. A band 80 is shown provided around the grip supported by and extending between the sections X and Y of the grip. The band is provided with perforations or lateral passages 81 which admit water from the exterior of the grip into the channel established between the sections of the grip.

The body 20 as shown in the drawings is provided with an enlarged portion or section 82 which extends between or serves to separate the sections X and Y of the grip 22 which portion of the body is provided with a plurality of perforations or lateral passages 83 that pass water from the channel between the grip sections to the inner end portion 33 of the cartridge. When the cartridge is in place the inner end portion 33 thereof is opposite the portion 82 of the body 20. It will be apparent from the drawings how water may find its way through the perforations 81 in the band 80, the perforations 83 in the body portion 82 and the perforations 34 in the cartridge portion 33 to finally reach the sealing disc 90 or valve disc 66. The various perforated parts establish a tortuous path through which water must pass in reaching the inner end of the cartridge, all of which is desirable during normal use of the equipment and serves to check small amounts of water such as may be deposited by the hands of the user from reaching the sealing disc. It is significant, however, that when the structure is submerged water quickly or immediately reaches the sealing disc, but the valve does not open until the device sinks to a depth where the pressure is sufficient to compress the spring thereby opening the valve. When the soluble seal is used it may be of such body or of such material as to dissolve only when submerged a predetermined length of time and it may thus act to delay or retard action of the structure.

In using the construction of the present invention the cartridge 23 is normally releasably retained in the body 20 in which position it in no way inconveniences the user and is concealed so that it does not mar the appearance of the equipment. During normal use of the equipment the several perforated elements, as above described, prevent moisture that may get on the equipment from reaching the sealing disc. In the event that the equipment is dropped into a body of water the valve will open only if the water is deep enough to allow the equipment to sink to sufficient depth. When the valve opens water reaches the charge 26. Upon the charge being activated by water deposited on it gas is generated causing the valve to close and causing the balloon to expand and force the closure 35 out of the case 30. The balloon carries with it the reinforcing net and when fully expanded the balloon appears as shown in Fig. 2, with the net embracing it. The parts are proportioned so that the balloon is of sufficient size to effectively float the entire structure, making it easy to retrieve.

In practice I proportion the parts so that the valve admits sufficient water to the shell to activate the charge within the shell before it is again closed. As pressure develops in the shell the valve disc 66 is seated against the opening confining the pressure to the balloon and preventing it from escaping through the openings 42 that admitted the water.

The cartridge 30 is normally disposable after use, and a replacement cartridge may then be positioned in the member 20.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A device subject to being submerged in water including, a tubular body, a cartridge having a releasable closure and received in the body, means engaged with the body releasably retaining the cartridge in the body, a balloon normally deflated and retained in the cartridge by the closure and anchored directly to the cartridge, and a gas generating charge in the cartridge subject to being activated by water and in communication with the balloon to deliver gas thereto and thereby float the device, said body being provided with lateral passages to admit water to the interior of the body upon the device being submerged in the water, said cartridge including a check valve adapted to allow the entry of water from within the body to the charge.

2. A device subject to being submerged in water including, a tubular body open at one end, a cartridge carrying a tubular shell and having a releasable closure at its outer end and received in the body so the closure is at said open end of the body, a balloon for floating the device and normally retained in the cartridge by the closure and having a neck anchored to and in sealed engagement with the tubular shell of the cartridge and in communication with the shell, and a gas generating charge in the tubular shell in the cartridge subject to being activated by water and delivering gas to the balloon through the tubular shell to inflate the balloon, said body being provided with lateral passages to admit water to the interior of the body upon the device being submerged in the water, said cartridge including a check valve adapted to allow the entry of water from within the body to the charge.

3. A device of the character described including, a tubular body open at one end, a hand grip surrounding the body, a cartridge carrying a tubular shell and having a releasable closure and received in the body from said end, means engaged with the body and releasably retaining the cartridge in the body so it is normally fixed therein, a deflected balloon normally in the cartridge and having a neck sealed with and anchored to said shell and in communication therewith, and a water activated gas generating charge in the tubular shell in the cartridge delivering gas to the shell to inflate the balloon and thereby float the device, said body having a channel and said grip passing water from the exterior of the grip to the charge to actuate it.

4. A device of the character described including, a tubular body having an enlarged perforate portion, a cartridge carrying a tubular shell and carried in the body, a balloon normally collapsed and carried in the cartridge in communication with the tubular shell, a water activated gas generating charge in the tubular shell in the cartridge and connected with the balloon to inflate it and thereby float the device, a water soluble seal protecting the charge in the tubular shell and accessible to water admitted through said portion of the body, and a grip on the body having a wall defining a water inlet opening to said portion of the body.

5. A device of the character described including, a tubular body having an enlarged perforate portion, a cartridge carried in the body carrying a tubular shell and having a perforate inner portion opposite said portion of the body, a balloon normally collapsed and carried in the cartridge in communication with the tubular shell, a water activated gas generating charge in the tubular shell in the cartridge to inflate the balloon and thereby float the device, a water soluble seal protecting the charge in the tubular shell and accessible to water admitted through said portion of the body, and a grip on the body including sections separated by said portion of the body and a perforate band between the sections and flush with the exterior of the grip.

6. In combination, a pole, a reel seat attached to the pole, and a handle in connection with the reel seat and including, a tubular body having an enlarged perforate portion, and a cartridge carried in the body, the cartridge including a balloon, a water activated gas generating charge delivering gas to inflate the balloon, and a water soluble seal protecting the charge and accessible to water admitted through said portion of the body, and a grip on the body with a wall defining a water inlet passage to said portion of the body.

7. A device subject to being submerged in water including a tubular body provided with lateral passages, a sleeve surrounding the body, a cartridge having a releasable closure and received in the body to be within the sleeve, releasable means for retaining the cartridge within the body, a balloon normally collapsed and retained in the cartridge by the closure and anchored directly to the cartridge and in fluid communication therewith, and a water activated gas generating charge in the cartridge adapted to deliver gas to the balloon, said sleeve having lateral passages to allow entry of water from the exterior of the sleeve to the passages of the tubular body and into the charge through the inner end of the cartridge, said cartridge including a check valve to permit water to pass into the cartridge to activate the charge.

8. A device subject to being submerged in water including a tubular body open at one end and provided with lateral passages, a sleeve surrounding the body, a cartridge including a tubular shell and a releasable closure, said cartridge being received in the body to be within the sleeve, releasable means for retaining the cartridge within the body, a balloon normally collapsed and retained in the cartridge by the closure and having a neck anchored to and in sealed engagement with the tubular shell of the cartridge and in fluid communication therewith, and a water activated gas generating charge in the shell adapted to release gas to the balloon through the shell to inflate the balloon to float the device, said sleeve having lateral passages to allow entry of water from the exterior of the sleeve to the passages of the tubular body and into the charge through the inner end of the cartridge, said cartridge including a check valve to permit water to pass into the cartridge to activate the charge.

FRANCIS V. BROADY.

References Cited in the file of this patent

UNITED STATES PATENTS

| Number | Name | Date |
|---|---|---|
| 806,730 | Zoll | Dec. 5, 1905 |
| 1,197,650 | Musorofiti | Sept. 12, 1916 |
| 1,255,512 | Clements | Feb. 5, 1918 |
| 1,458,822 | Halter | June 12, 1923 |
| 1,490,157 | Cherniak | Apr. 15, 1924 |
| 2,190,531 | Kaboskey et al. | Feb. 13, 1940 |
| 2,192,450 | Miller | Mar. 5, 1940 |
| 2,220,395 | Carter | Nov. 5, 1940 |
| 2,379,053 | Weingart | June 26, 1945 |
| 2,402,143 | Arenstein | June 18, 1946 |
| 2,479,021 | Perkins | Aug. 16, 1949 |

FOREIGN PATENTS

| Number | Country | Date |
|---|---|---|
| 388,092 | Great Britain | Feb. 23, 1933 |